Oct. 27, 1925.

H. B. U. ARONSEN 1,559,029

SPRING SUSPENSION

Filed Sept. 20, 1924    2 Sheets-Sheet 1

INVENTOR.
HALFDAN B. U. ARONSEN.
BY
ATTORNEYS.

Patented Oct. 27, 1925.

1,559,029

UNITED STATES PATENT OFFICE.

HALFDAN B. U. ARONSEN, OF OAKLAND, CALIFORNIA.

SPRING SUSPENSION.

Application filed September 20, 1924. Serial No. 738,942.

*To all whom it may concern:*

Be it known that HALFDAN B. U. ARONSEN, a citizen of the United States, residing at Oakland, in the county of Alameda and State of California, has invented certain new and useful Improvements in Spring Suspension, of which the following is a specification.

My invention is an improved spring suspension, the object of which is to combine a leaf spring with a vertical shock absorber, so that the load is supported by the shock absorber through the spring, thus obtaining the full advantage of both to relieve shocks.

In the annexed drawing in which the preferred form of my invention is illustrated:

Figure 1:
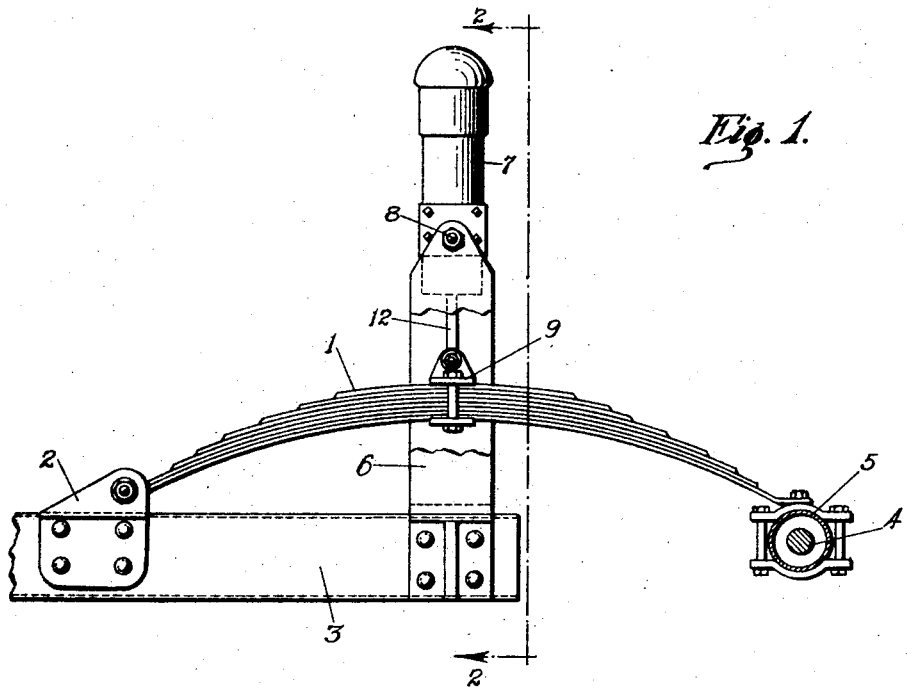
Figure 1 is a side elevation of my spring mounting.
Figure 2:
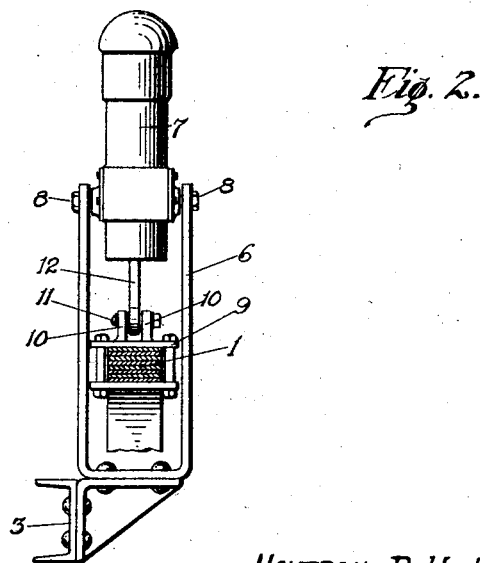
Figure 2 is a sectional view taken on the line 2—2 of Fig. 1.

Referring more particularly to the drawing, a leaf spring 1 is mounted at one end to a plate 2, which is secured to the vehicle frame 3, and at the other end to the axle 4 by means of a suitable clamp 5. A U shaped bracket 6 rises from the frame 3 at about the center of the spring 1, and extends on either side thereof.

A shock absorber 7 of any desired type (either coil, spring or air) is mounted between the arms of the bracket 6, by pins 8—8 extending therethrough, thus permitting the shock absorber to swing as described. The wheel mounted on the end of the spring swings on an arc with the plate 2 as a center which also causes the shock absorber 7 to oscillate, this being permitted by its pivoted mounting.

A clamp 9 encircles the spring 1, and is formed with a pair of ears 10—10, a bolt 11 extending therethrough, and through the pitman 12 of the shock absorber 7, thus linking the spring 1 and the shock absorber together.

Figure 3:
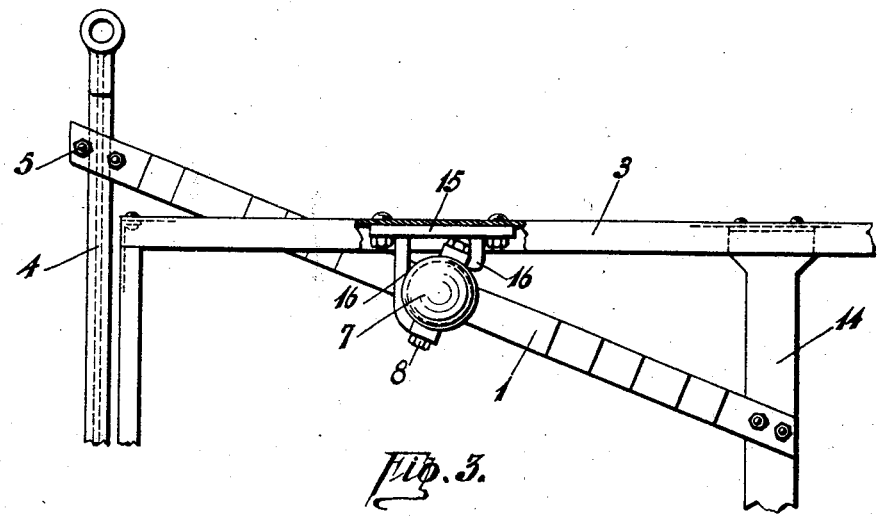
Figure 3 is a plan view of a slightly modified form of spring mounting.
Figure 4:
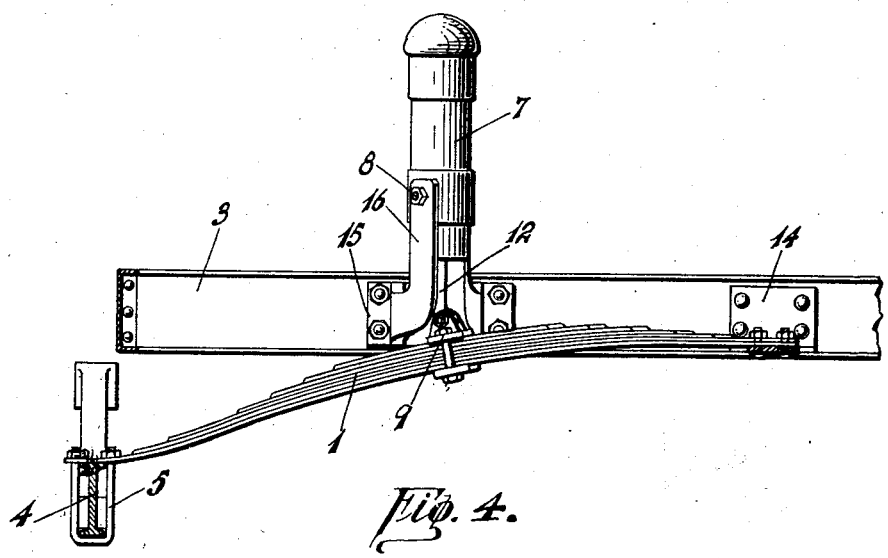
Figure 4 is a side elevation of the same.

The modified form shown in Figures 3 and 4 is particularly adapted for the front spring suspension of a vehicle, and is particularly designed so that the shock absorber against which the spring works is mounted inside of the frame, and consequently may be positioned within the hood, and will thus not be exposed to view. The construction is identical to that already described above, with the exception that the spring 1 is set at a slight angle to the frame 3, the forward end being clamped to the axle, and the rear end is secured to a transverse plate 14.

The bracket 15 which supports the shock absorber 7 is secured to the frame 3, and has upwardly extending arms 16—16 to which the shock absorber is pivoted, thus enabling the shock absorber to swing in the direction of movement of the spring 1.

Having described my invention, I claim:

1. A vehicle spring suspension comprising a leaf spring secured at one end to the vehicle, and at the other end to the axle, a shock absorber secured to said frame, a pitman extending from said shock absorber and secured to said leaf spring.

2. A vehicle spring suspension comprising a leaf spring secured at one end to the vehicle, and at the other end to the axle, a vertically positioned shock absorber secured to said frame, a pitman extending from said shock absorber and secured to the center of said leaf spring.

3. A vehicle spring suspension comprising a leaf spring secured at one end to the vehicle, and at the other end to the axle, a bracket secured to said frame, a shock absorber pivoted to said bracket, a pitman extending from said shock absorber, said pitman being pivotally secured to the center of said spring.

In testimony whereof I affix my signature.

HALFDAN B. U. ARONSEN.